Feb. 4, 1964    R. HOPT ETAL    3,120,632
POWER UNIT-LOAD UNIT ASSEMBLY
Filed April 22, 1957    2 Sheets-Sheet 1
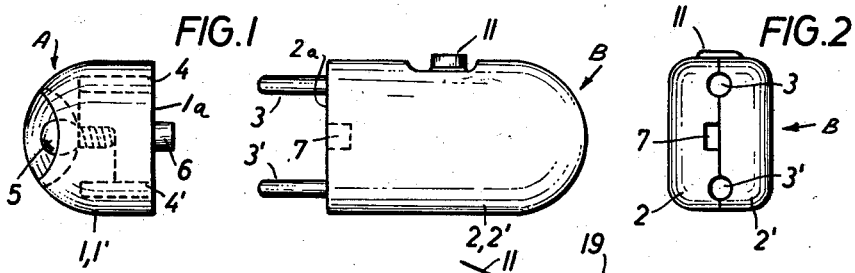
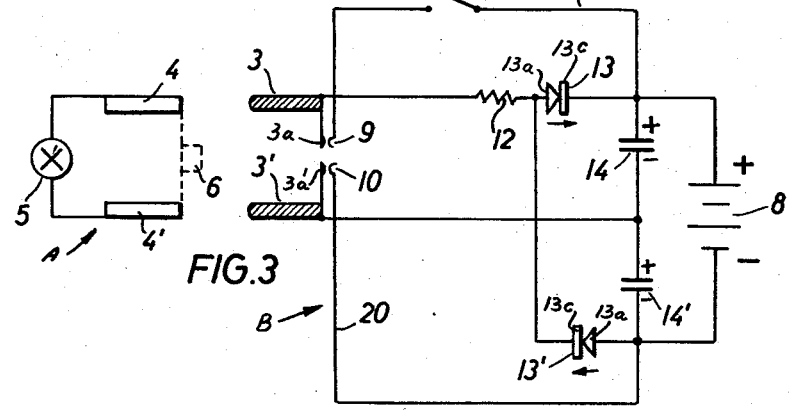
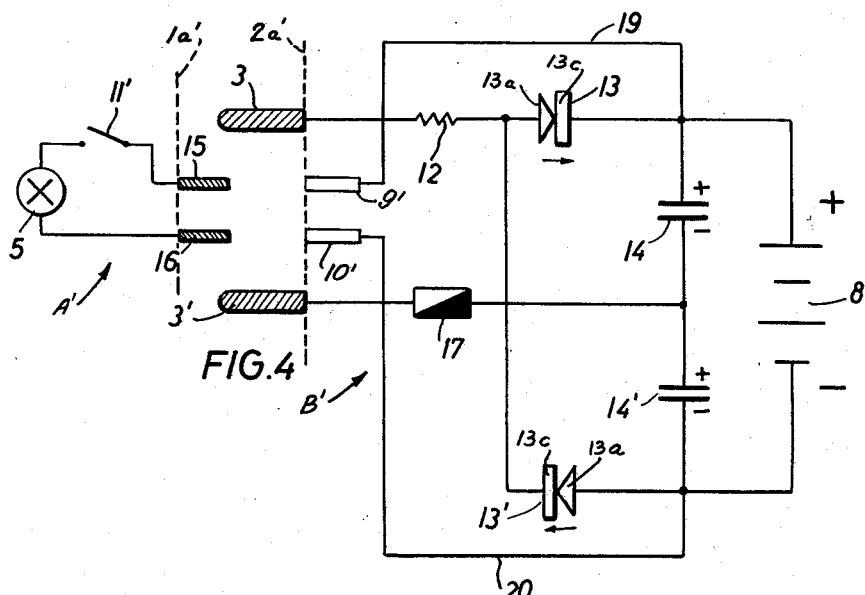
INVENTORS.
Rudolf Hopt, Ludwig Falk
and Alfons Haring
BY Michael S. Striker
agt.

Feb. 4, 1964   R. HOPT ETAL   3,120,632
POWER UNIT-LOAD UNIT ASSEMBLY
Filed April 22, 1957   2 Sheets-Sheet 2

INVENTORS
Rudolf Hopt, Ludwig Falk
and Alfons Häring
BY Michael S. Striker
agt.

United States Patent Office 3,120,632
Patented Feb. 4, 1964

3,120,632
POWER UNIT-LOAD UNIT ASSEMBLY
Rudolf Hopt, Ludwig Falk, and Alfons Häring, all of Schorzingen, near Rottweil, Germany, assignors to Karl Hopt G.m.b.H., Schorzingen, near Rottweil, Germany
Filed Apr. 22, 1957, Ser. No. 654,273
Claims priority, application Germany Aug. 25, 1956
24 Claims. (Cl. 320—2)

The present invention relates to a power unit-load unit assembly.

More particularly, the present invention relates to a portable power unit-load unit assembly in which the power unit contains a battery capable of being charged.

It is an object of the present invention to provide a readily portable assembly which consists of a power unit and of a load unit, which units may be electrically and mechanically connected to each other so as to form a compact assembly that can easily be carried in one hand.

It is another object of the present invention to provide a combined power unit-load unit assembly, the power unit of which can easily be disconnected from the load unit and be connected to any readily available source of alternating current, such as by being plugged into a conventional household wall outlet.

It is still a further object of the present invention to provide a power unit which can easily be connected to any one of a number of different load units.

The objects of the present invention further include the provision of a portable combined power unit-load unit assembly which is absolutely foolproof in that even a child can connect the individual units to each other and, if necessary, disconnect the units from each other and plug the power unit into a wall outlet until the battery contained in the power unit is sufficiently charged.

It is yet another object of the present invention to provide a portable combined power unit-load unit assembly which can easily be mass-produced at low cost.

It is also an object of the present invention to provide a power unit-load unit assembly which is very rugged, which can withstand rough usage, and which will give extremely long periods of trouble-free service.

The objects of the present invention furthermore include the provision of a portable combined power unit-load unit assembly, the power unit of which has prongs which enable the power unit to be plugged into a wall outlet or the like, but which are completely hidden from view when the power unit is connected to the load unit.

The objects of the present invention additionally include the provision of a portable combined power unit-load unit assembly of the above described type in which the prongs of the power unit may be hidden from view even when the power unit is separate from a load unit.

With the above objects in view, the present invention mainly consists in a portable combined power unit-load unit assembly which comprises a load unit and a power unit adapted to be mechanically and electrically connected to the load unit. The power unit includes a storage battery and prong means electrically connected thereto for connecting the power unit to a source of electric energy in such a manner that the storage battery may be charged thereby. The prong means are so constructed and arranged that at least when the units are mechanically and electrically connected to each other, the prong means occupy a position wherein they are entirely within at least one of the units.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic view of a power unit-load unit assembly according to the present invention, the two units being shown separately;

FIG. 2 is an end view of the power unit shown in FIG. 1;

FIG. 3 is a schematic diagram of one embodiment of a power unit-load unit assembly according to the present invention;

FIG. 4 is a schematic diagram of another embodiment of a power unit-load unit assembly according to the present invention;

Figure 5:
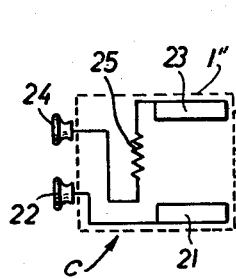
FIG. 5 is a schematic diagram of a connecter adapted to be used in conjunction with a power unit incorporated in the power unit-load unit assembly shown in FIGS. 1–3.

Referring now to the drawings, and to FIGS. 1–3 thereof in particular, there is shown a power unit-load unit assembly consisting of a load unit A and a power unit B. The former is shown in the form of a light and is composed of a pair of opposite shells 1, 1' which may be made of any suitable material, such as plastic, the shells being connected to each other in any suitable manner, such as by screws, or by means of an adhesive. The load unit A contains a load component such as a lamp socket adapted to receive a bulb 5, a suitable reflector being provided for focusing the light emitted by the bulb. The surface portion of the load unit which forms its end face is indicated at 1a, and a pair of sockets 4, 4' which are electrically connected to the bulb 5 open at this surface portion. Additionally, the load unit is formed with a boss portion 6 which projects from the surface portion 1a, the purpose of which will be described below.

The power unit B is likewise composed of a pair of opposite shells 2, 2' which are also preferably made of plastic and which are connected to each other in any suitable manner. The surface portion of the power unit B which forms its end face is indicated at 2a, and a pair of prongs 3, 3' project from this surface portion. The cross-section of the prongs corresponds to that of the sockets 4, 4', and the arrangement of the parts is such that when the units A and B are placed next to each other with their surface portions 1a, 2a superposed upon each other, the prongs 3, 3' are received within the sockets 4, 4', respectively. Preferably, the prongs are firmly held by the sockets, so that the prongs serve as a mechanical connection between the units A and B.

The power unit B contains a storage battery 8, i.e., a battery capable of being charged. Such a battery may be composed of small acid-proof hermetically sealed nickel-cadmium cells. Suitable rectifier means are electrically connected to the battery and to the prongs 3, 3' so that the entire power unit may be connected directly to a source of alternating current. This source may be in the form of an ordinary household wall outlet connected to a voltage source within the range of 105 to 230 v. and at a frequency of between 25 to 60 c.p.s. Thus, while the drawing illustrates the prongs 3, 3' as having a substantially circular cross-section, it will be understood that they may have a substantially rectangular cross-section similar to that of an ordinary male plug.

The rectifier means include two serially connected capacitors 14, 14' which are in parallel with the battery 8. The lead joining two plates of the two capacitors is connected to the prong 3' whereas the opposite plates of the capacitors are connected to the prong 3 by way of oppositely directed rectifiers 13, 13', a resistor 12 being provided for limiting the current surge. The anode and cathode terminals of the rectifiers are indicated at 13a and 13c, respectively, so that the flow of current is limited to the directions shown by the arrows. The capacitance of the capacitors 14, 14' is so selected that they act as charging capacitors as well as a capacitive input impedance which is relatively large as compared to the internal resistance of the battery 8. In this way, when the power unit B is connected to the alternating current source, part of the current will during one half cycle flow from one of the prongs to the other prong by way of one of the capacitors, whereas the remainder will flow from this one prong through the battery 8 and thence through the other capacitor to the other prong. During the other half cycle the current flow will be reversed, so that the above described rectifier means act as a full-wave rectifier which charges the battery 8 throughout both half cycles.

In practice, the rectifiers 13, 13' are so selected that the power unit B can be plugged into and the battery be charged by a voltage source which delivers anywhere between 105 and 230 v.

Additional circuit means are provided for electrically connecting the prongs 3, 3' directly across the battery 8. The circuit means include leads 19 and 20 the ends 9, 10 of which constitute stationary contacts adapted to cooperate, respectively, with the movable contacts 3a, 3a' connected to the prongs 3, 3'. The contacts 9, 10 and 3a, 3a' constitute a normally open switch and, according to the present invention, this switch is located in the region of the surface portion 2a. Preferably, the switch is located in a recess which opens in this surface portion 2a, and the recess is adapted to receive the above described boss portion 6 which projects from the surface portion 1a of the load unit A. The arrangement of the parts is such that when the two units are connected to each other, the boss portion 6 will act as a switch actuator and press the contacts 3a, 3a' into engagement with the contacts 9, 10, thereby placing the bulb 5 directly across the battery 8. An additional manually operable switch 11 may be provided in the circuit incorporating the battery 8 and the bulb 5 for opening and closing this circuit whenever desired.

It will be seen from the above that the prongs 3, 3' accomplish a triple function, in that they serve as a mechanical connector between the load unit A and the power unit B, as well as an electrical connector between these units. Additionally, the prongs act as an electrical connector between the power unit B and a source of electric energy for charging the battery 8.

As may best be seen in FIG. 2, the recess 7 is located eccentrically or non-symmetrically relative to the power unit B. The boss 6 on the load unit A must therefore be positioned in a corresponding position, and the boss portion 6 and recess 7 may therefore serve as an indexing device which prevents the two units from being connected to each other in any but one desired manner, so that the units may be connected to each other with due regard to the polarity of the battery 8. Such an arrangement is desirable in cases where the load unit incorporates transistor or other electrical components which must be connected to a direct current source in a certain manner.

The arrangement shown in FIG. 4 differs from the above described embodiment in that the prongs 3, 3' are not relied upon to establish an electrical connection between the battery 8 and the load component of the load unit A'. Instead, the ends of the leads 19 and 20 are connected to socket means such as leaf springs or sockets 9' and 10' which open at the end face of power unit B', the end face being shown schematically at 2a', and the load component of the load unit A' is connected to two prongs 15, 16 which project through the end face 1a' of the load unit and which are adapted to be received in the sockets 9', 10'. Thus, when the surface portions 1a', 2a' are superposed upon each other, the two units are mechanically connected to each other by the prongs 3, 3' and electrically connected to each other by the prongs 15, 16 and the sockets 9', 10'.

Additionally, the arrangement shown in FIG. 4 differs from the embodiment shown in FIGS. 1–3 in that a switch 11' for opening and closing the circuit incorporating the load component of the load unit A' and the battery 8 of the power unit B' is located in the load unit. Also, a fuse 17 has been included in the lead connected to the prong 3'.

FIG. 5 shows a connector C which is adapted to be used with the above described power unit B for enabling the storage battery 8 thereof to be connected to a source of direct current in such a manner as to be charged thereby. The connector comprises a connector body shown schematically at 1" which is formed with an end face or surface portion 1a" that corresponds to the surface portion 2a of the power unit B, a pair of input terminals 22, 24, and a pair of sockets 21, 23 which open at the surface portion 1a" and which are adapted to receive the prongs 3, 3'. The input terminals 22, 24 are connected to the sockets 21, 23, respectively, a current limiting resistor 25 being provided in the lead connecting the terminal 24 and the socket 23.

Additionally, the connector C is formed with a boss portion 6' which serves the same function as the above described boss portion 6 of the load unit A. Thus, when the prongs of the power unit B are inserted into the sockets of the connector C, the switch incorporating the contacts 3a, 3a' and 9, 10 is closed thereby connecting the battery 8 directly across the input terminals 22, 24 of the connector C. In this way, the prongs 3, 3' serve to connect the power unit B and the connector C both mechanically and electrically to each other, so that the battery 8 may be charged by a direct current source connected to the input terminals of the connector.

Figure 8:
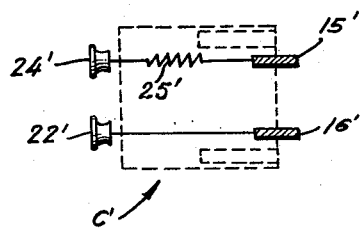
FIG. 8 is a schematic diagram of a connector adapted to be used in conjunction with a power unit incorporated in the power unit-load assembly shown in FIG. 4.

A similar connector C', shown in FIG. 8, may be provided for enabling the power unit B' (FIG. 4) to be connected to a direct current source. This connector is similar to the above described connector C, except that it includes additional prongs 15' and 16' which are electrically connected to the input terminals 22' and 24'. The prongs project through the end face of the connector and are adapted to be received in the sockets 9', 10' of the power unit B'. In such an arrangement the prongs 3, 3' of the power unit serve to connect the power unit and connector to each other mechanically only, the electrical connection being provided by the additional prongs 15' and 16' of the connector.

Figure 6:
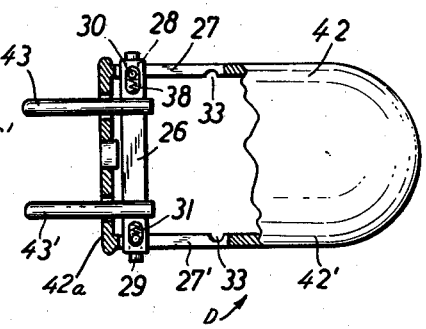
FIG. 6 is a schematic view, partly in section, of one embodiment of a power unit having retractable prongs.
Figure 7:
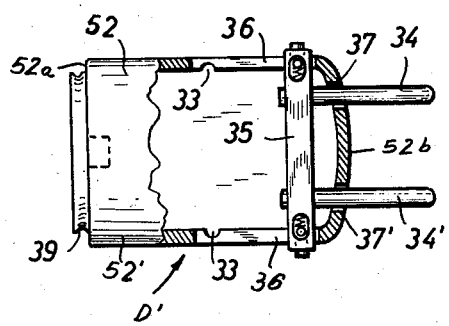
FIG. 7 is a schematic view, partly in section, of another embodiment of a power unit having retractable prongs.

FIGS. 6 and 7 show power units D and D', respectively, in which the prongs are mounted for movement between a projecting position wherein they project exteriorly of the power unit and a retracted position wherein they are entirely within the unit. As a result, when the prongs are in their projecting position the power unit may be connected to a source of electric energy in such a manner that the storage battery is charged thereby, and when the prongs are in their retracted position the power unit, taken by itself, forms an individual unit the prongs of which are entirely within the unit.

In the embodiment shown in FIG. 6, the prongs 43 and 43' are carried by a bridge 26 made of insulating material, the ends of which are slidably arranged in slots 27, 27' formed in the shells 42, 42' of the power unit D. The bridge 26 is formed in its ends with longitudinal bores 28 in each of which a pressure pin 29 is slidably arranged. Each pressure pin carries a cross piece 30 which is arranged transversely to the respective pin and projects through a pair of diametrically opposite elongated slots 31 that communicate with the respective bore 28. Each cross piece 30 extends beyond the bridge 26 and is adapted to be received in recesses 33 formed in the shells 42, 42'. These recesses are arranged at those points along the slots 27, 27' which correspond to the projecting and retracted positions of the prongs, and each cross piece is outwardly biased by a spring 38 so as to act as a detent for maintaining the bridge 26 carrying the prongs 43, 43' in either projecting or retracted position. Thus, the bridge may be moved from one position to another by first pressing the two pressure pins 29 inwardly and then shifting the bridge 26 to the other position.

Suitable circuit means (not shown) are provided for electrically connecting the prongs 43, 43' to the rectifier means at least at such time when the prongs are in their projecting position. These circuit means may be in the form of electric contacts which are carried by the prongs and which engage stationary terminals of the rectifier circuit when the bridge 26 occupies the position shown in FIG. 6.

In the embodiment shown in FIG. 6 the bridge 26 is so positioned that when the prongs are in their projecting position they project through the end face 42a of the power unit D, which end face is that surface portion of the power unit which is superposed upon the corresponding surface portion of the load unit when the power and load units are connected to each other. Thus, the prongs 43, 43' may, as in the above described embodiments, be used to connect the power and load units to each other, either both mechanically and electrically or simply mechanically, although other connecting means, such as a bayonet coupling or other retaining means may be used for mechanically connecting the power and load units to each other.

The power unit D' shown in FIG. 7 differs from the power unit D of FIG. 6 in that the prongs 34, 34' in their projecting position project through end face 52b of the power unit which is opposite the end face 52a, the latter being the end face which is superposed upon the corresponding end face of a load unit. Thus, the bridge 35 carrying the prongs 34, 34' is arranged in slots 36 which are formed in the opposite end of the shells 52, 52', and the prongs 34, 34' in their projecting position extend through openings 37, 37' formed in the end face 52b. Thus, when the prongs are in their projecting position, the power unit D' may be plugged into a wall outlet so that the battery contained in the power unit (not shown in FIG. 7) may be charged.

The power unit D' is formed with a bayonet coupling 39 so as to be adapted to be connected to a correspondingly constructed load unit. Preferably, such load unit is formed with prongs corresponding to the prongs 15, 16 of FIG. 4, and the power unit D' includes sockets adapted to cooperate with these prongs, so that the load unit may be connected directly across the storage battery.

It will be seen from the above that in power unit-load unit assemblies constructed in accordance with any of the above embodiments, the prongs of the power unit will, at least when the unit is connected to a load unit, be completely covered and be hidden from view.

It will be understood that each of the elements described above, or two or more together, may also find a useful application in other types of power unit-load unit assemblies differing from the types described above.

While the invention has been illustrated and described as embodied in a portable power unit-load unit assembly which can easily be held in one hand and in which the load unit is in the form of a light, it is not intended to be limited to the details shown, since various modifications and structural changes may be made without departing in any way from the spirit of the present invention. For example, the load unit can be in the form of a photoflash device, a blinker signal, a ventilator or fan, a shaving apparatus, a medicinal or treating apparatus, a lighted microscope, an electric timepiece, and many others.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A portable combined power unit-load unit assembly, comprising, in combination, a power unit formed with a surface portion and including a storage battery and prong means projecting through said surface portion and electrically connected to said storage battery for connecting said power unit by said prong means to said load unit, and, alternatively, to a source of electric energy in such a manner that said storage battery is charged thereby; the electrical connection between said prong means and said battery including two rectifier means, two capacitor means, and means electrically interconnecting said prong means with said battery, said rectifier means and said capacitor means to provide for the battery a full-wave rectification of the charging voltage applied across said prong means with voltage drop across said capacitor means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, the other of said capacitor means a current-limiting impedance for the charging current and the said one of said capacitor means a charging capacitor connected across said battery; said capacitor means having a capacity of such value that said capacitor means act as charging capacitors as well as a capacitive input impedance which is relatively large as compared to the internal resistance of the battery; and a load unit formed with a surface portion corresponding to said surface portion of said power unit and being provided with receptacle means for receiving said prong means, said units being so constructed and arranged that when said surface portions thereof are superposed upon each other, said units are mechanically and electrically connected to each other by engagement of said receptacle means with said prong means, and said prong means of said power unit are completely covered.

2. A portable combined power unit-load unit assembly, comprising, in combination, a load containing unit including receptacle means electrically connected with said load and adapted to receive contact prongs for applying a potential to said load; and a power unit adapted to be mechanically and electrically connected to said load unit and including a storage battery, two rectifier means and two capacitor means electrically connected to said storage battery, the value of capacitance of said capacitor means being so selected that said capacitor means act as charging capacitors as well as a capacitive input impedance which is relatively large as compared to the internal resistance of the battery; and prong means electrically connected to said rectifier means for connecting said power unit to a source of alternating current in such a manner that said storage battery may be charged thereby, and, alternatively, to said load unit by insertion of said prong means into said receptacle means, said prong means being so constructed and arranged that at least when said units are mechanically and electrically connected to each other said prong means may occupy a position wherein they are entirely within said load unit, the electrical connection between said prong means and said battery including means electrically interconnecting said prong means with said battery, said rectifier means and said capacitor means to provide a full-wave rectification of the charging voltage applied across said prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery.

3. A portable combined power unit-load unit assembly, comprising, in combination, a power unit formed with a surface portion and including a storage battery, two rectifier means and two capacitor means electrically connected to said storage battery, the capacitance of said capacitor means being so selected that said capacitor means act as charging capacitors as well as a capacitive input impedance which is relatively large as compared to the internal resistance of the battery; and prong means electrically connected to said rectifier means and projecting through said surface portion for connecting said power unit to said load unit, and, alternatively, to a source of alternating current in such a manner that said storage battery is charged thereby; and a load unit formed with a surface portion corresponding to said surface portion of said power unit and being provided with receptacle means for receiving said prong means, said units being so constructed and arranged that when said surface portions thereof are superposed upon each other, said units are mechanically and electrically connected to each other by engagement of said receptacle means with said prong means, and said prong means of said power unit are completely covered, the electrical connection between said prong means and said battery including means electrically interconnecting said prong means with said battery, said rectifier means and said capacitor means to provide for the battery a full-wave rectification of the charging voltage applied across said prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery.

4. A portable combined power unit-load unit assembly, comprising, in combination, a power unit formed with a surface portion and including a storage battery, two rectifier means and two capacitor means electrically connected to said storage battery, the capacitance of said capacitor means being so selected that said capacitor means act as charging capacitors as well as a capacitive input impedance which is relatively large as compared to the internal resistance of the battery, and prong means electrically connected to said rectifier means and projecting through said surface portion for connecting said power to said load unit, and, alternatively, to a source of alternating current in such a manner that said storage battery is charged thereby; a load unit formed with a surface portion corresponding to said surface portion of said power unit and being provided with receptacle means for receiving said prong means, said units being so constructed and arranged that when said surface portions thereof are superposed upon each other, said units are mechanically connected to each other by engagement of said receptacle means with said prong means, and the latter are completely covered by said load unit; and means for electrically connecting said load unit directly across said storage battery when said surface portions of said units are superposed upon each other, the electrical connection between said first-mentioned prong means and said battery including means electrically interconnecting said prong means, said battery, said rectifier means and said capacitor means to provide a full-wave rectification of the charging voltage applied across said first-mentioned prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery.

5. A portable combined power unit-load unit assembly, comprising, in combination, a power unit formed with a surface portion and including a storage battery, two rectifier means and two capacitor means electrically connected to said storage battery, the capacitance of said capacitor means being so selected that said capacitor means act as charging capacitors as well as a capacitive input impedance which is relatively large as compared to the internal resistance of the battery, and prong means electrically connected to said rectifier means and projecting through said surface portion for connecting said power unit to said load unit, and, alternatively, to a source of alternating current in such a manner that said storage battery is charged thereby; a load unit formed with a surface portion corresponding to said surface portion of said power unit and being provided with receptacle means for receiving said prong means, said units being so constructed and arranged that when said surface portions thereof are superposed upon each other, said units are mechanically and electrically connected to each other by engagement of said receptacle means with said prong means, and the latter are completely covered by said load unit; and means for electrically connecting said prong means and consequently said load unit directly across said storage battery when said surface portions of said units are superposed upon each other, the electrical connection between said first-mentioned prong means and said battery including means electrically interconnecting said prong means, said battery, said rectifier means and said capacitor means to provide a full-wave rectification of the charging voltage applied across said first-mentioned prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery.

6. A portable combined power unit-load unit assembly, comprising, in combination, a power unit formed with a surface portion and including a storage battery, two rectifier means and two capacitor means electrically connected to said storage battery, and prong means electrically connected to said rectifier means and projecting through said surface portion for connecting said power unit to said load unit, and, alternatively, to a source of alternating current in such a manner that said storage battery is charged thereby; the electrical connection between said prong means and said battery including means electrically interconnecting said prong means, said battery, said rectifier means and said capacitor means to provide for the battery a full-wave rectification of the charging voltage applied across said prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery; said capacitor means having a capacity of such value that said capacitor means act as charging capacitors as well as a capacitive input impedance which is relatively large as compared to the internal resistance of the battery; a load unit formed with a surface portion corresponding to said surface portion of said power unit and being provided with receptacle means for receiving said prong means, said units being so constructed and arranged that when said surface portions thereof are superposed upon each other, said units are mechanically connected to each other by engagement of said receptacle means with said prong means, and the latter are completely covered by said load unit; and additional prong means carried by said load unit and adapted to be received within said power unit for electrically connecting said load unit directly across said storage battery when said surface portions of said units are superposed upon each other.

7. A portable combined power unit-load unit assembly, comprising, in combination, a power unit formed with a first surface portion and including a storage battery, two rectifier means and two capacitor means electrically connected to said storage battery, the capacitance of said capacitor means being so selected that said capacitor means act as charging capacitors as well as a capacitive input impedance which is relatively large as compared to the internal resistance of the battery, and prong means electrically connected to said rectifier means and projecting through said first surface portion for connecting said power unit to said load unit, and, alternatively, to a source of alternating current, in such a manner that said storage battery is charged thereby; and a load unit formed with a second surface portion corresponding to said first surface portion of said power unit and with socket means opening at said second surface portion and adapted to receive said prong means of said power unit, said units being so constructed and arranged that when said surface portions thereof are superposed upon each other said prong means of said power unit are located entirely within said socket means of said load unit in such a manner that said units are mechanically and electrically connected to each other by said prong means, the electrical connection between said first-mentioned prong means and said battery including means electrically interconnecting said prong means, said battery, said rectifier means and said capacitor means to provide a full-wave rectification of the charging voltage applied across said first-mentioned prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery.

8. A portable combined power unit-load unit assembly, comprising, in combination, a power unit formed with a first surface portion and including a storage battery, two rectifier means and two capacitor means electrically connected to said storage battery, the capacitance of said capacitor means being so selected that said capacitor means act as charging capacitors as well as a capacitive input impedance which is relatively large as compared to the internal resistance of the battery, prong means projecting through said first surface portion and electrically connected to said rectifier means for connecting said power unit to said load unit, and, alternatively, to a source of alternating current in such a manner that said storage battery is charged thereby, and circuit means for electrically connecting said prong means directly across said storage battery, said circuit means including normally open switch means located in the region of said first surface portion; and a load unit formed with a second surface portion corresponding to said first surface portion of said power unit and including a load component, socket means opening at said second surface portion and adapted to receive said prong means of said power unit, said socket means being electrically connected to said load component, and switch actuating means located in the region of said second surface portion and being adapted to cooperate with said switching means of said circuit means of said power unit, said units being so constructed and arranged that when said surface portions thereof are superposed upon each other said prong means of said power unit are located entirely within said socket means of said load unit and mechanically connect said units to each other and said switch actuating means of said load unit cooperates with said switch means in such a manner as to close the same, whereby said load component of said load unit is connected directly across said storage battery of said power unit, the electrical connection between said first-mentioned prong means and said battery including means electrically interconnecting said prong means, said battery, said rectifier means and said capacitor means to provide a full-wave rectification of the charging voltage applied across said first-mentioned prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery.

9. A portable combined power unit-load unit assembly as defined in claim 8, and additional manually operable switch means in said circuit means for opening and closing the same whenever desired.

10. A portable combined power unit-load unit assembly as defined in claim 8 wherein said power unit is formed with a recess opening at said first surface portion, wherein said switch means are located in said recess, and wherein said switch actuating means of said load unit comprise a boss portion projecting from said second surface portion and adapted to be received in said recess when said surface portions of said units are superposed upon each other.

11. A portable combined power unit-load unit assembly as defined in claim 10 wherein said recess and said boss portion are so shaped as to form indexing means for limiting superposition of said surface portions of said unit to such superposition wherein said prong means is received in said socket means in a predetermined manner, whereby said units may be connected to each other with due regard to the polarity of said storage battery.

12. A portable combined power unit-load unit assembly, comprising, in combination, a power unit formed with a first surface portion and including a storage battery, two rectifier means and two capacitor means electrically connected to said storage battery, first prong means projecting through said first surface portion and electrically connected to said rectifier means for connecting said power unit to a source of alternating current in such a manner that said storage battery is charged thereby, the electrical connection between said first prong means and said battery including means electrically interconnecting said first prong means, said battery, said rectifier means and said capacitor means to provide a full-wave rectification of the charging voltage applied across said first prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery; said capacitor means having a capacity of such value that said capacitor means act as charging capacitors as well as a capacitive input impedance which is relatively large as compared to the internal resistance of the battery; and first socket means opening at said first surface portion and electrically connected directly across said storage battery; and a load unit formed with a second surface portion corresponding to said first surface portion of said power unit and including a load component, second prong means electrically connected to said load component, said second prong means projecting through said second surface portion and being adapted to be received in said first socket means of said power unit, and second socket means opening at said second surface portion and adapted to receive said first prong means of said power unit, said units being so constructed and arranged that when said surface portions thereof are superposed upon each other, said first prong means of said power unit are located entirely within said second socket means of said load unit, and mechanically connect said units to each other and said second prong means of said load unit are located entirely within said first socket means of said power unit thereby electrically connecting said load component directly across said storage battery.

13. A portable power unit-load unit assembly as defined in claim 12, and manually operable switch means in the electric circuit incorporating said load component and said storage battery for opening and closing said circuit whenever desired.

14. A portable combined power unit-load unit assembly, comprising, in combination, a power unit formed with a first surface portion and including a storage battery, two rectifier means and two capacitor means electrically connected to said storage battery, the capacitance of said capacitor means being so selected that said capacitor means act as charging capacitors as well as a capacitive input impedance which is relatively large as compared to the internal resistance of the battery, prong means electrically connected to said rectifier means, the electrical connection between said prong means and said battery including means electrically interconnecting said prong means, said battery, said rectifier means and said capacitor means to provide a full-wave rectification of the charging voltage applied across said prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery; and means for mounting said prong means on said power unit for movement between projecting position wherein said prong means project through said first surface portion of said power unit and a retracted position wherein said prong means are located within said power unit; and a load unit formed with a second surface portion corresponding to said first surface portion of said power unit, said units being so constructed and arranged that when said surface portions thereof are superposed upon each other and said prong means are in their projecting position, said units are mechanically and electrically connected to each other and said prong means of said power unit are completely covered by said load unit, whereby said units may be connected to each other when said prong means are in their projecting position and whereby said power unit taken by itself, may, when said prong means are in their projecting position, be connected directly across a source of alternating current in such a manner that said storage battery is charged thereby, and, when said prong means are in their retracted position, form an individual unit the prong means of which are entirely within the unit.

15. A portable combined power unit-load unit assembly, comprising, in combination, a load unit; and a power unit adapted to be mechanically and electrically connected to said load unit and including a storage battery and prong means electrically connected thereto, the electrical connection between said prong means and said battery including two rectifier means, two capacitor means, and means electrically interconnecting said prong means, said battery, said rectifier means and said capacitor means to provide a full-wave rectification of the charging voltage applied across said prong means and to constitute, during rectification of one-half of the applied alternating voltage, one of said capacitor means a current-limiting impedance for the charging current and the other of said capacitor means a charging capacitor connected across said battery, and during rectification of the other half of the applied alternating voltage, said other capacitor means a current-limiting impedance for the charging current and the said one capacitor means a charging capacitor connected across said battery; the capacitance of said capacitor means being so selected that said capacitor means act as charging capacitors as well as a capacitive input impedance which is relatively larger as compared to the internal resistance of the battery, said prong means being mounted for movement between a projecting position wherein they project exteriorly of said power unit and a retracted position wherein they are entirely within said power unit, whereby when said prong means are in their projecting position said power unit may be connected to a source of electric energy in such manner that said storage battery may be charged thereby and whereby when said prong means are in their retracted position said power unit, taken by itself, form an individual unit, the prong means of which are entirely within the unit.

16. A connector for use with a power unit as defined in claim 8 for enabling said storage battery thereof to be connected to a source of direct current in such a manner as to be charged thereby, comprising, in combination, a body formed with a second surface portion corresponding to said first surface portion of said power unit; input terminal means on said body; socket means opening at said second surface portion and adapted to receive said prong means of said power unit, said socket means being electrically connected to said input terminal means; and switch actuating means located in the region of said second surface portion and being adapted to cooperate with said switching means of said circuit means of said power unit, said power unit and said body being so constructed and arranged that when said surface portions thereof are superposed upon each other, said load unit of said power unit are received by said socket means of said connector and mechanically connect said power unit and said connector to each other and said switch actuating means of said connector cooperates with said switch means in such a manner as to close the same, whereby said storage battery of said power unit is connected directly across said input terminal means of said connector.

17. A connector for use with a power unit as defined in claim 12 for enabling said storage battery thereof to be connected to a source of direct current in such a manner as to be charged thereby, comprising, in combination, a body formed with a second surface portion corresponding to said first surface portion of said power unit; input terminal means on said body; second prong means electrically connected to said input terminal means, said second prong means projecting through said second surface portion and being adapted to be received in said first socket means of said power unit; and second socket means opening at said second surface portion and adapted to receive said first prong means of said power unit, said power unit and said body being so constructed and arranged that when said surface portions thereof are superposed upon each other, said first prong means of said power unit are received by said second socket means of said connector and mechanically connect said power unit and said connector to each other and said second prong means of said connector are received by said first socket means of said power unit thereby electrically connecting said storage battery of said power unit directly across said input terminal means of said connector.

18. In a power unit of the character described, in combination, a storage battery having positive and negative terminals; a pair of input terminals; two capacitors each having opposite plates; two rectifiers each having an anode and a cathode; and connecting means connecting one of said input terminals to one plate of each capacitor, connecting said positive terminal of said storage battery to the other plate of one of said capacitors and to the cathode of one of said rectifiers, connecting said negative terminal of said storage battery to the other plate of the other of said capacitors and to the anode of the other of said rectifiers, and connecting the anode of said one rectifier and the cathode of said other rectifier to the other of said input terminals, whereby an A.C. supplied across said input terminals charges each of said capacitors in such a manner that the same charge said storage battery, the capacitance of said capacitors being so selected that they act as charging capacitors as well as a capacitive input impedance which is relatively large as compared to the internal resistance of the battery 19. The combination defined in claim 18, and a current limiting resistor in series with one of said input terminals.

20. A circuit for charging a relatively low voltage storage battery from an alternating current source of the order of 110 volts, comprising said battery, a pair of input terminals, dry metallic diode rectifier means, voltage peak-limiting resistor means, and voltage-dropping and charging capacitor means all permanently connected in series with one another, and means for limiting the reverse voltage applied to said rectifier means to a relatively low voltage comprising another dry metallic diode rectifier, which with respect to the input terminals is poled reversely to said rectifier means, said other rectifier and said rectifier means being serially connected with said battery, said capacitor means being connected across said battery to provide voltage dropping capacitor means and charging capacitor means connected across said battery to provide during each half of the rectification a voltage-dropping capacitor means in said series circuit and a charging capacitor means effectively connected across said battery, and said capacitor means having a capacity of such small size that substantially the entire voltage reduction is produced thereby substantially without the generation of heat.

21. In a flashlight storage battery charging apparatus of minimum size and arranged to generate a minimum amount of heat during charging, so that the apparatus may be housed in a completely closed pocket flashlight casing of minimum size, said apparatus comprising a load consisting solely of a storage battery; a pair of alternating current input terminals; capacitive impedance means connected across said battery for reducing the relatively high alternating voltage at said input terminals to the magnitude required for charging the battery; a solid dry diode rectifier serially connected with the capacitive reactance of the impedance means, the battery and the input terminals, with a direct current connection from one terminal of the rectifier to one terminal of the battery; a second solid diode rectifier poled reversely to the first-mentioned rectifier with respect to the input terminals and connected from the other terminal of the battery to the other terminal of said first rectifier so that the voltage for the first rectifier is tapped off across said second rectifier; the capacitive reactance of said impedance means being of such a magnitude that the predominant part of the voltage reduction occurs thereacross, so that said voltage reduction is produced substantially without heat and a resistance connected in series with the capacitive reactance and each rectifier and having a magnitude sufficient for limiting the maximum current through both rectifiers to a safe value.

22. In a self-contained power unit of the character described and having a housing, in combination: a storage battery having positive and negative terminals; a pair of prongs projecting from said surface and insertable directly into the outlet sockets of a source of alternating current to recharge the battery; two capacitors each having opposite plates; two rectifiers; and connecting means connecting one of said prongs to one plate of each capacitor, connecting one terminal of said storage battery to the other plate of one of said capacitors and to one side of one of said rectifiers, connecting the other terminal of said battery to the other plate of the other of said capacitors and to one side of the other rectifier, and connecting the other side of said one rectifier and the other side of said other rectifier to the other of said prongs, said rectifiers being connected with the same polarity in a series circuit across the terminals of said battery, whereby an alternating current voltage applied across said prongs charges each of said capacitors in such a manner that the same charge said storage battery, the capacitance of said capacitors being so chosen as to provide a capacitive input impedance which is relatively large as compared to the internal resistance of the battery.

23. In a portable two-unit electrical utility device, a load unit including an electrical utility element and receptacle means, a power unit including prong means, rectifier means, voltage peak-limiting resistor means, and voltage dropping and charging capacitor means all permanently connected in series with one another, and means for limiting the reverse voltage applied to said rectifier means to a relatively low voltage comprising further rectifier means, which with respect to the prong means is poled reversely to said first-mentioned rectifier means, a rechargeable battery, both of said rectifier means being serially connected with said battery, said capacitor means being operatively connected across said battery and having a capacity of such small size that substantially the entire voltage reduction is produced thereby substantially without the generation of heat, said prong means being insertable into said receptacle means to positively interconnect said units into a unitary structure, and alternatively, into said outlet receptacle to recharge said battery through said circuit connection means, and circuit means carried by said units and electrically connecting said element and battery when said units are interconnected, as aforesaid.

24. In a portable two-unit electrical utility device, a load unit including an electrical utility element and receptacle means, a power unit including a rechargeable battery, a pair of prong means forming alternating current input terminals, capacitive impedance means for reducing the relatively high alternating voltage at said terminals to the magnitude required for charging the battery, first rectifier means serially connected with the capacitive reactance of the impedance means, the battery and the input terminals, with a direct current connection from one terminal of said first rectifier means to one terminal of the battery, second rectifier means poled reversely to the first-mentioned rectifier means with respect to the input terminals and connected from the other terminal of the battery to the other terminal of said first rectifier means so that the voltage for the first rectifier means is tapped off across said second rectifier means, said capacitive impedance means being operatively connected across said battery, and the capacitive reactance of said impedance means being of such a magnitude that the predominant part of the voltage reduction occurs thereacross, so that said voltage reduction is produced substantially without heat, and a resistance connected in series with the capacitive reactance and each rectifier means and having a magnitude sufficient for limiting the maximum current through both rectifiers to a safe value, said prong means being insertable into said receptacle means to positively interconnect said units into a unitary structure, and alternatively, into the outlet receptacle of an alternating current source to recharge said battery, and circuit means carried by said units and electrically connecting said element and battery when said units are interconnected.

References Cited in the file of this patent

UNITED STATES PATENTS

| | | |
|---|---|---|
| 1,729,753 | Stryker et al. | Oct. 1, 1929 |
| 2,552,203 | Morgan | May 8, 1951 |
| 2,628,339 | Werner | Feb. 10, 1953 |
| 2,642,520 | Coolidge et al. | June 16, 1953 |
| 2,880,306 | Witte | Mar. 31, 1959 |
| 3,067,373 | Hopt et al. | Dec. 4, 1962 |

FOREIGN PATENTS

| | | |
|---|---|---|
| 750,071 | France | May 15, 1933 |
| 631,992 | Germany | July 1, 1936 |

OTHER REFERENCES

Ser. No. 427,480, Zdansky (A.P.C.), published June 15, 1943 (abandoned).

"Radio Amateurs' Handbook," CQ, June 1945, pp. 27, 28.